United States Patent
Lu et al.

(10) Patent No.: US 11,345,616 B2
(45) Date of Patent: May 31, 2022

(54) HETEROJUNCTION COMPOSITE MATERIAL CONSISTING OF ONE-DIMENSIONAL $IN_2O_3$ HOLLOW NANOTUBE AND TWO-DIMENSIONAL $ZNFE_2O_4$ NANOSHEET, AND APPLICATION THEREOF IN WATER POLLUTANT REMOVAL

(71) Applicant: SOOCHOW UNIVERSITY, Suzhou (CN)

(72) Inventors: Jianmei Lu, Suzhou (CN); Najun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 182 days.

(21) Appl. No.: 16/870,390

(22) Filed: May 8, 2020

(65) Prior Publication Data
US 2020/0354235 A1 Nov. 12, 2020

(30) Foreign Application Priority Data
May 9, 2019 (CN) .......................... 201910386058.7

(51) Int. Cl.
*C02F 1/30* (2006.01)
*B01J 23/80* (2006.01)
(Continued)

(52) U.S. Cl.
CPC ................. *C02F 1/30* (2013.01); *B01J 23/80* (2013.01); *B01J 35/004* (2013.01); *B01J 35/023* (2013.01);
(Continued)

(58) Field of Classification Search
CPC ....... C02F 1/30; C02F 1/72; C02F 1/70; B01J 37/08; B01J 37/34; B01J 23/80
See application file for complete search history.

(56) References Cited

FOREIGN PATENT DOCUMENTS

CN 105597765 A * 5/2016

OTHER PUBLICATIONS

Rational Design of ZnFe2O4/In2O3 Nanoheterostructures: Efficient Photocatalyst for Gaseous 1,2-Dichlorobenzene Degradation and Mechanistic Insight reference discloses the heterojunction In2O3/ZnFe2O4 and nano structure; Fei Zhang,† Xinyong Li,*,† Qidong Zhao,† and Dongke Zhang*,‡ China (Year: 2016).*

* cited by examiner

Primary Examiner — Walter D. Griffin
Assistant Examiner — Cameron J Allen
(74) Attorney, Agent, or Firm — SZDC Law P.C.

(57) ABSTRACT

A heterojunction composite material consisting of one-dimensional $In_2O_3$ hollow nanotube and two-dimensional $ZnFe_2O_4$ nanosheets and its application are disclosed. When using this material for catalytic reactions, the hollow cavity and two-dimensional nanosheets of hollow nanomaterials can not only reduce the migration distance to accelerate the electron-hole separation, but also provide a large surface area and rich active sites to promote pollution adsorption and surface catalysis. At the same time, multiple light scattering or reflection in the hollow cavity of the hollow nanomaterials can increase light absorption and utilization. In addition, the heterojunction photocatalyst constructed by growing two-dimensional semiconductor nanosheets on a tubular substrate can promote the effective separation of photogenerated electrons and photogenerated holes, thereby improving the catalytic efficiency. In terms of catalytic performance, $In_2O_3$ @ $ZnFe_2O_4$ shows effective degradation of tetracycline, and due to its ferromagnetism, it shows convenient and good separation effect and has good recycling performance.

9 Claims, 5 Drawing Sheets

(51) Int. Cl.
*B01J 35/00* (2006.01)
*B01J 35/02* (2006.01)
*B01J 37/08* (2006.01)
*B01J 37/34* (2006.01)
*C02F 101/38* (2006.01)

(52) U.S. Cl.
CPC ............ *B01J 37/08* (2013.01); *B01J 37/348* (2013.01); *C02F 2101/38* (2013.01); *C02F 2305/10* (2013.01)

HETEROJUNCTION COMPOSITE MATERIAL CONSISTING OF ONE-DIMENSIONAL $In_2O_3$ HOLLOW NANOTUBE AND TWO-DIMENSIONAL $ZnFe_2O_4$ NANOSHEET, AND APPLICATION THEREOF IN WATER POLLUTANT REMOVAL

This application claims priority to Chinese Patent Application No. 201910386058.7, filed on May 9, 2019, which is incorporated by reference for all purposes as if fully set forth herein.

FIELD OF THE INVENTION

The present invention relates to the technical field of nano composite materials and photocatalytic technology, in particular to a preparation method of a heterojunction composite material consisting of one-dimensional $In_2O_3$ hollow nanotube and two-dimensional $ZnFe_2O_4$ nanosheets, and the application in highly effective photocatalytic removal of organic pollutants such as antibiotic in water.

TECHNICAL BACKGROUND

With the rapid development of society, human beings are facing a shortage of renewable energy and increasingly serious environmental pollution problems. Among various environmental pollution problems, water pollution, including discharge of domestic sewage and industrial wastewater, is particularly serious due to the large amount, complex composition and refractory degradation. Traditional treatment methods, including gravity settling, chemical decomposition and biodegradation, have the following problems such as low removal efficiency, incomplete degradation, high energy consumption and may cause secondary pollution. Recently, semiconductor photocatalysis technology, as one of the most promising technologies, has attracted extensive attention. Based on the basic principle of photocatalytic, semiconductor photocatalyst absorbs light energy and will generate photo induced charges under the illumination of light, which can degrade toxic organic pollutants into small molecules, even completely turns to carbon dioxide and water. Metal oxide semiconductors such as $TiO_2$ and ZnO have been widely used in photocatalytic technology. However, if the band gap is too large, the semiconductor material used as a photocatalyst will not be able to make full use of the energy in the visible region of sunlight; on the contrary, if the band gap is too small, then the reduction ability of the conduction band electrons or the oxidation ability of the valence band holes may not meet the requirements of the photocatalytic reaction.

Therefore, the full utilization of the energy of sunlight and the appropriate redox ability are mutually restrictive, and it is difficult to be satisfied at the same time in the photocatalytic system of a single semiconductor. Moreover, in the photocatalytic system of a single semiconductor, the recombination of electrons and holes generated by light is also relatively serious, which will undoubtedly greatly reduce the photocatalytic performance.

SUMMARY OF THE INVENTION

The object of the present invention is to provide a heterojunction composite material ($In_2O_3@ZnFe_2O_4$) consisting of one-dimensional hollow nanotube loaded with two-dimensional nanosheets and its preparation method. The constructed composite material can realize the effective degradation and removal of tetracycline in the water body under the irradiation of visible light.

It is found that the existing problems of contradiction between using the energy of sunlight and having a proper redox ability, and the serious phenomenon of recombination of electrons and holes can be solved by the construction of the semiconductor heterojunction of the present invention, inside the heterojunction, the electrons are transferred from the catalyst component with high energy to the catalyst component with low energy, and the holes are transferred in the opposite direction, which promotes the migration and separation of electrons and holes; and the construction of the heterojunction can simultaneously utilize the wide-range light response of narrow-band gap semiconductor and the strong redox ability of wide-band gap semiconductor, thereby greatly enhancing the photocatalytic efficiency.

In order to achieve the above object, the specific technical proposal of the invention is as follows:

A heterojunction composite material ($In_2O_3@ZnFe_2O_4$) consisting of one-dimensional $In_2O_3$ hollow nanotube and two-dimensional $ZnFe_2O_4$ nanosheets, whose preparation method comprising the following steps:

1) using indium salt as raw material to prepare In template by solvent-thermal method;
2) calcining the In template under air atmosphere to obtain $In_2O_3$;
3) using electrodeposition method to load zinc-iron bimetallic hydroxide (ZnFe-LDH) nanosheets on the surface of $In_2O_3$ to obtain an $In_2O_3$ supported zinc-iron bimetallic hydroxide composite material ($In_2O_3@ZnFe$-LDH); then calcining the $In_2O_3$ supported zinc-iron bimetallic hydroxide composite material at high temperature in air to obtain a heterojunction composite material ($In_2O_3@ZnFe_2O_4$) consisting of one-dimensional $In_2O_3$ hollow nanotube and two-dimensional $ZnFe_2O_4$ nanosheets.

A method for removing pollutants in water, comprising the following steps:

1) using indium salt as raw material to prepare In template by solvent-thermal method;
2) calcining the In template under air atmosphere to obtain $In_2O_3$;
3) using electrodeposition method to load zinc-iron bimetallic hydroxide nanosheets on the surface of $In_2O_3$ to obtain an $In_2O_3$ supported zinc-iron bimetallic hydroxide composite material; then calcining the $In_2O_3$ supported zinc-iron bimetallic hydroxide composite material at high temperature in air to obtain a heterojunction composite material consisting of one-dimensional $In_2O_3$ hollow nanotube and two-dimensional $ZnFe_2O_4$ nanosheets;
4) adding the heterojunction composite material consisting of one-dimensional $In_2O_3$ hollow nanotube and two-dimensional $ZnFe_2O_4$ nanosheets to water containing pollutants, stirring to finish the removal of water pollutants.

In the present invention, in step (1), dissolving indium salt and terephthalic acid in a solvent to obtain a mixed solution; then the mixed solution is refluxed to obtain an In template. Preferably, said indium salt is $In(NO_3)_3 \cdot 4.5H_2O$ and the solvent is DMF; the heating temperature of the reflux reaction is 110 to 130° C., and the time is 25 to 35 min; the dosage ratio of indium salt, terephthalic acid and solvent is 30 mg: 30 mg: 30 mL.

The step (1) can be as follows:

Add $In(NO_3)_3 \cdot 4.5H_2O$, terephthalic acid and DMF to a 100 ml single-necked round-bottom flask, stir for 2 to 5 min to get a colorless and transparent uniform mixed solution; then, put this mixed solution at the temperature of 110 to 130° C. and reflux for 25 to 35 min; after the reaction, cool to room temperature, suction filter with 0.22 to 0.45 μm microporous membrane to obtain white product, then wash with absolute ethanol 2 to 3 times, then dry in a 60° C. blast drying oven for 1 to 2 hours to obtain an In template.

In the present invention, in step (2), dispersing the In template in ethanol and Nafion solution to obtain a coating liquid; then coating the coating liquid on the surface of an ITO glass, drying and calcining in an air atmosphere to prepare $In_2O_3$. The calcination is first incubating at 120° C. for 2 h, then raising the temperature to 500 to 550° C. with the heating rate of 2 to 5° C./min, and calcining for 2 hours. $In_2O_3$ prepared by step (2) is attached on the ITO glass.

In the present invention, in step (3), the electrodeposition method uses a three-electrode system, and the electrolyte solution is obtained by dissolving zinc nitrate hexahydrate and ferric nitrate nonahydrate in water, the electrodeposition time is 400 s to 600 s; the high temperature calcination is carried out at 450 to 500° C. for 10~12 h, and the heating rate is 2 to 5° C./min. Preferably, in the three-electrode system, a platinum wire electrode serves as a counter electrode and a calomel electrode serves as a reference electrode; the molar ratio of zinc nitrate hexahydrate and ferric nitrate nonahydrate is 1:2.

The step (3) can be as follows:

Electrodepositing using the ITO glass attached with $In_2O_3$ obtained in step (2) as an electrode, at a molar ratio of 1:2, dissolving zinc nitrate hexahydrate and ferric nitrate nonahydrate in deionized water, using this mixed solution as an electrolyte solution. Carrying out the electrodeposition in am electrochemical workstation CHI660E with a three-electrode system (ITO glass with $In_2O_3$ attached to the surface as the working electrode, platinum wire electrode as the counter electrode, calomel electrode as the reference electrode), after electrodeposition, washing with deionized water 2 to 3 times to obtain a composite material of $In_2O_3$ supported zinc-iron bimetallic hydroxide ($In_2O_3$ @ ZnFe-LDH), and drying at room temperature for 12 h. In the air atmosphere, calcined at the temperature of 450 to 500° C. (heating rate of 2 to 5° C./min) for 10 to 12 h, to obtain a heterojunction composite material consisting of one-dimensional $In_2O_3$ hollow nanotube and two-dimensional $ZnFe_2O_4$ nanosheets ($In_2O_3$ @ $ZnFe_2O_4$). The electrodeposition time is 400 s, 500 s, and 600 s, respectively expressed as $In_2O_3$ @ $ZnFe_2O_4$-400 s, $In_2O_3$ @ $ZnFe_2O_4$-500 s, and $In_2O_3$ @$ZnFe_2O_4$-600 s. For comparison, the zinc-iron bimetallic hydroxide (ZnFe-LDH) nanosheets are synthesized by hydrothermal method, and then placed in a muffle furnace at 450 to 500° C. in an air atmosphere (heating rate 2 to 5° C./min), calcined for 10 to 12 h to obtain pure $ZnFe_2O_4$ nanosheets.

In the present invention, the pollutant in step (4) is antibiotic, specifically tetracycline. The stirring is preferably performed first protected from light, and then under visible irradiation. Preferably, the time of stirring protected from light is 30 minutes.

The present invention disclosed the application of the heterojunction composite material consisting of one-dimensional $In_2O_3$ hollow nanotube and two-dimensional $ZnFe_2O_4$ nanosheets in removing water pollutant.

The invention incorporates two oxide semiconductors into heterojunction with hollow structure and nanosheet subunits. In terms of construction of photocatalytic nanomaterials, 2D nanosheet materials have unique electronic structures (with a short transmission distance in thickness direction), which are favorable for the rapid transport of carriers to the surface and reduce the recombination rate of photogenerated electrons and holes. In addition, 2D nanosheet materials have high specific surface area with abundant active sites, which are favorable for further photocatalytic reaction. Furthermore, In terms of hollow structures, often aggregated by many nanoparticles, the improved light absorption in the hollow space and large surface area are beneficial to light absorption and pollutants adhesion. In the meanwhile, light will be reflected and refracted many times in the hollow cavity, which can prolong the residence time of light, thus generating more photogenerated electrons and holes for further photocatalytic process. At the same time, hollow structural materials often have thin shells, which also conducive to the rapid transport and separation of carriers. Herein, we successfully prepared hollow structure heterojunction $In_2O_3$@$ZnFe_2O_4$ incorporates two oxide semiconductors into heterojunction with hollow structure and nanosheet subunits, which can further increase the specific surface area to expose more active sites for further reaction. In addition, the charge diffusion distance can be shorten by loading $ZnFe_2O_4$ nanosheets on the outer surface of hollow $In_2O_3$, thus effectively improve the photocatalytic activity of the composites.

Compared with the prior art, the invention has the following advantages:

1. The one-dimensional hollow $In_2O_3$ nanotube disclosed by the invention is calcined with an In template, the preparation method is simple and the morphology is regular, which is beneficial to the next modification.

2. The heterojunction composite material consisting of one-dimensional $In_2O_3$ hollow nanotube and two-dimensional $ZnFe_2O_4$ nanosheets ($In_2O_3$@$ZnFe_2O_4$) disclosed by the invention has a wide light response range, which is a good visible-light-active photocatalyst.

3. The heterojunction composite material consisting of one-dimensional $In_2O_3$ hollow nanotube and two-dimensional $ZnFe_2O_4$ nanosheets ($In_2O_3$@$ZnFe_2O_4$) disclosed by the invention has large surface area and abundant active sites are beneficial to light absorption, pollutants adhesion and further photodegradation.

4. The heterojunction composite material consisting of one-dimensional $In_2O_3$ hollow nanotube and two-dimensional $ZnFe_2O_4$ nanosheets ($In_2O_3$@$ZnFe_2O_4$) disclosed by the invention has a unique magnetic property, which can be easily separated using an external magnetic field. In addition, the raw materials used in the preparation of this material are cheap and common, which is in favor of its further popularization and application.

DETAILED DESCRIPTION OF THE INVENTION

Embodiment 1

Figure 1:
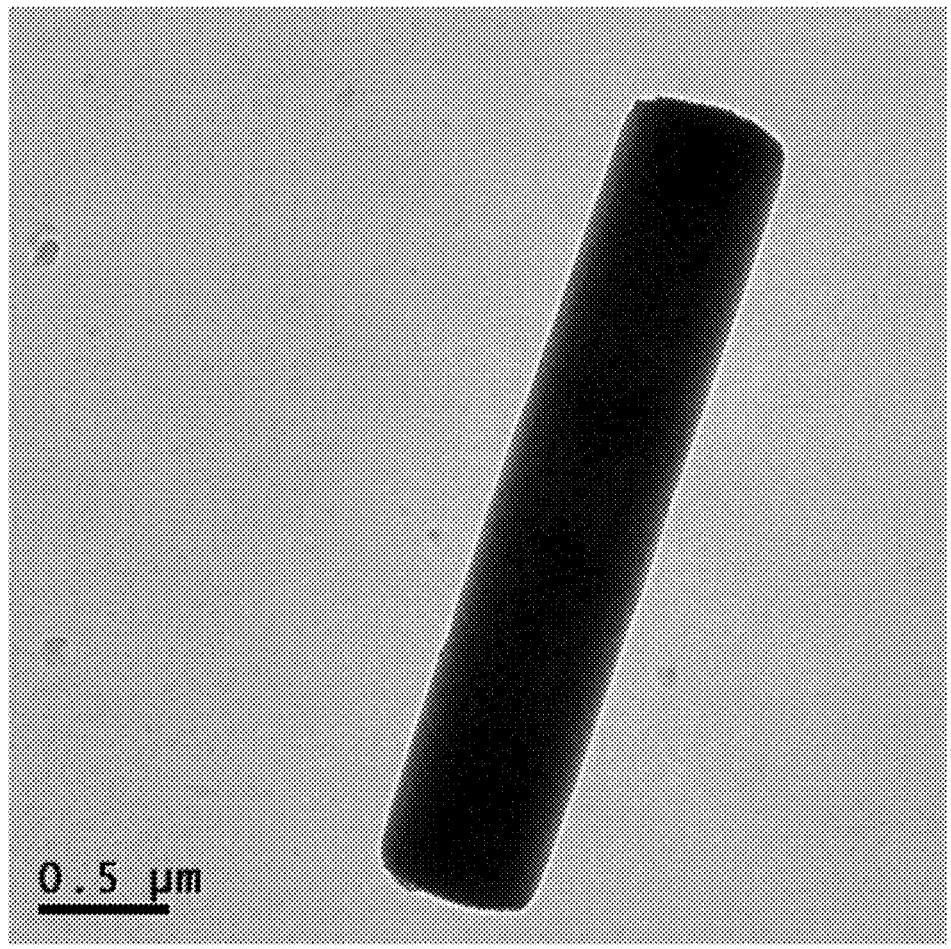
FIG. 1 is the TEM image of In template.

Synthesis of In template through solvothermal method comprising following steps: 30 mg of $In(NO_3)_3.4.5H_2O$ and 30 mg of terephthalic acid are dissolved in 30 ml of N,N-Dimethylformamide (DMF) and stirred for 2 min to obtain a colorless and transparent solution. Then, the resultant solution is refluxed at 120° C. for 30 min. After cooling to room temperature, pumping filtrate with 0.22 μm microporous filter membrane to obtain a white product, washed with ethanol three times and dried at 60° C. in a blast drying oven for 2 h to obtain the In template. As can be seen in FIG. 1, the TEM image shows that the In template exhibited solid structure, with about 3.1 μm in length and about 650 nm in diameter.

Embodiment 2

Figure 2:
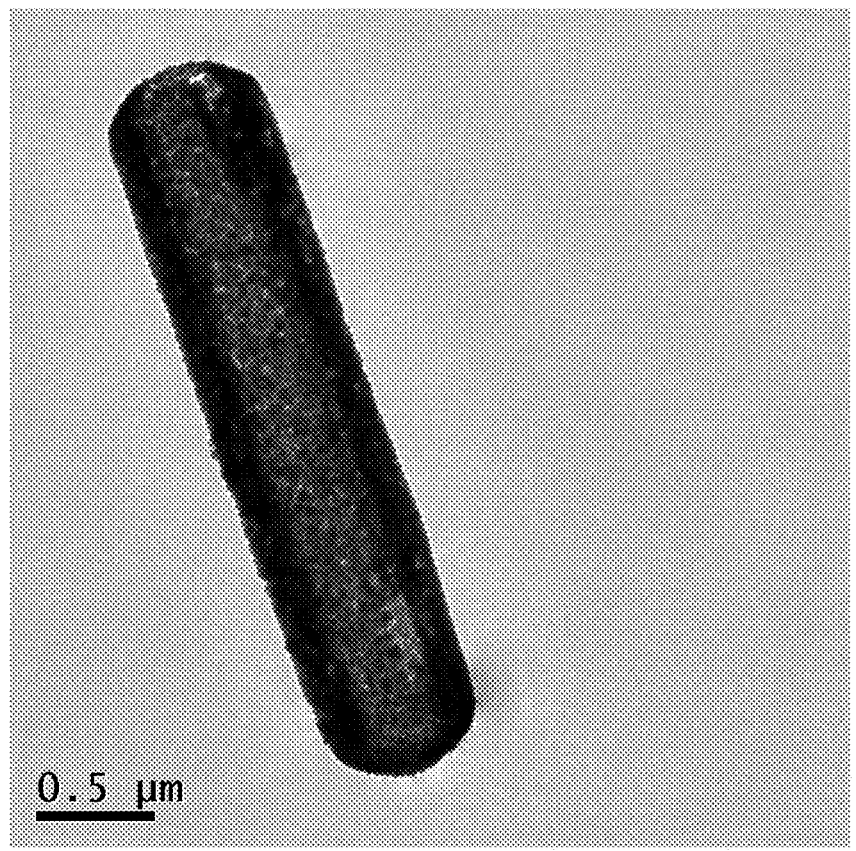
FIG. 2 is the TEM image of $In_2O_3$.

Preparation of one-dimensional hollow nanotube $In_2O_3$: First, weigh 20 mg of the In template obtained in Embodiment 1 and disperse it in 200 μl of absolute ethanol and 10 μl of Nafion solution, disperse it uniformly by ultrasound for 20 min, then apply it to the surface of the ITO glass and dry it. It is placed in a muffle furnace and kept at 120° C. for 2 h in an air atmosphere, then heated to 500° C. at a heating rate of 5° C./min and calcined for 2 h to obtain one-dimensional hollow nanotube $In_2O_3$ and its transmission electron microscope shown in Figure. 2, the obtained $In_2O_3$ has a hollow structure, and is attached to ITO glass ($In_2O_3$/ITO). If not holding at 120° C. for 2 hours, directly calcining at 500° C. for 2 hours, the obtained $In_2O_3$/ITO is used in Embodiment 4, and the heterojunction composite material consisting of one-dimensional $In_2O_3$ hollow nanotube and two-dimensional $ZnFe_2O_4$ nanosheets prepared according to Embodiment 4 is used with the method of Embodiment 6, and after 120 minutes of illumination, the removal rate of tetracycline in the aqueous solution reached 71%.

As a comparison, the preparation of pure $In_2O_3$ hollow nanotube does not need to be attached to the ITO glass. The specific operation is as follows: Weigh 200 mg of the In template in Embodiment 1 and place it in a muffle furnace, and insulate at 120° C. under an air atmosphere for 2 h, then heated to 500° C. and calcined for 2 h, the heating rate is 5° C./min, to obtain pure $In_2O_3$ hollow nanotube, and the transmission electron microscopy diagram is similar to FIG. 2.

Embodiment 3

Preparation of one-dimensional hollow nanotube and two-dimensional nanosheet heterojunction composites ($In_2O_3$ @ $ZnFe_2O_4$-400 s): Weigh 2.23 g zinc nitrate hexahydrate and 6.05 g ferric nitrate nonahydrate in 100 ml of deionized water and mix them, the solution is an electrolyte solution, using a three-electrode system (ITO glass with $In_2O_3$ attached to the surface obtained in Embodiment 2 as a working electrode, a platinum wire electrode as a counter electrode, and a calomel electrode as a reference electrode). Electrodeposition in the electrochemical workstation CHI660E Deposit at −1 V (vs.SCE) voltage for 400 s, wash with deionized water 3 times after the deposition to obtain $In_2O_3$ supported zinc-iron bimetal hydroxide composite material ($In_2O_3$ @ ZnFe-LDH-400 s). Drying at room temperature for 12 h; after drying, the above product is placed in a muffle furnace and calcined at 450° C. (heating rate of 5° C./min) under an air atmosphere for 10 h to obtain one-dimensional indium oxide hollow nanotube/two-dimensional zinc ferrite nanosheet heterojunction composite material ($In_2O_3$ @ $ZnFe_2O_4$-400 s), the resulting composite only forms a thin shell sheath on the surface of $In_2O_3$.

Embodiment 4

Figure 3:
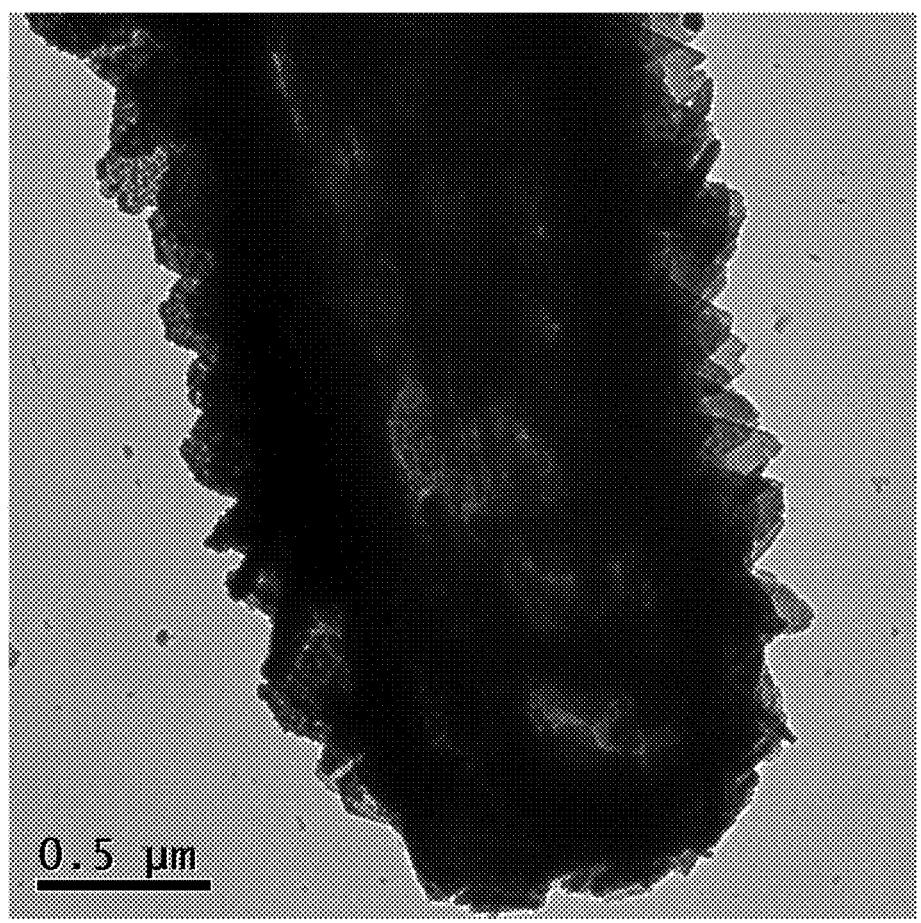
FIG. 3 is the TEM image of $In_2O_3$@$ZnFe_2O_4$-500.

Preparation of one-dimensional hollow nanotube and two-dimensional nanosheet heterojunction composites ($In_2O_3$ @ $ZnFe_2O_4$-500 s): Weigh 2.23 g zinc nitrate hexahydrate and 6.05 g ferric nitrate nonahydrate and dissolve them in 100 ml deionized water. The mixed solution is an electrolyte solution, using a three-electrode system (ITO glass with $In_2O_3$ attached to the surface obtained in Embodiment 2 as a working electrode, a platinum wire electrode as a counter electrode, and a calomel electrode as a reference electrode). Carry out electrodeposition in the electrochemical workstation CHI660E, deposit at −1V (vs.SCE) voltage for 500 s, wash with deionized water 3 times after the reaction, to obtain $In_2O_3$ supported zinc-iron bimetallic hydroxide composite material ($In_2O_3$ @ ZnFe-LDH-500 s), dried at room temperature for 12 h. After drying, put the above product in a muffle furnace and calcinate at 450° C. (heating rate is 5° C./min) under air atmosphere for 10 h to obtain a heterojunction composite material consisting of one-dimensional $In_2O_3$ hollow nanotube and two-dimensional $ZnFe_2O_4$ nanosheets ($In_2O_3$ @ $ZnFe_2O_4$-500 s). The transmission electron micrograph is shown in FIG. 3. The resulting composite is a relatively regular nanosheet formed on the surface of $In_2O_3$. Dry $In_2O_3$ @ ZnFe-LDH-500 s is unstable and cannot be used as a water treatment catalyst.

For the purpose of comparison, the preparation method of pure $ZnFe_2O_4$ nanosheets is: first, a zinc-iron bimetal hydroxide (ZnFe-LDH) nanosheet is prepared by hydrothermal reaction; then, the above zinc-iron bimetal hydroxide (ZnFe-LDH) nanosheet is placed in a muffle furnace and calcined at 450° C. in air atmosphere (heating rate is 5° C./min) for 10 h to obtain two-dimensional zinc ferrite nanosheets.

Embodiment 5

Preparation of one-dimensional hollow nanotube and two-dimensional nanosheet heterojunction composites ($In_2O_3$ @ $ZnFe_2O_4$-600 s): Weigh 2.23 g of zinc nitrate hexahydrate and 6.05 g of ferric nitrate nonahydrate in 100 ml of deionized water, the mixed solution is an electrolyte solution. Using a three-electrode system (ITO glass with $In_2O_3$ attached to the surface obtained in Embodiment 2 as a working electrode, a platinum wire electrode as a counter electrode, and a calomel electrode as a reference electrode). Carry out electrodeposition in the electrochemical workstation CHI660E, deposit at −1V (vs.SCE) voltage for 600 s, wash with deionized water 3 times after the reaction to obtain $In_2O_3$ supported zinc iron bimetal hydroxide composite material ($In_2O_3$ @ $ZnFe_2O_4$-600 s), dry at room temperature for 12 h, After drying, the above product is placed in a muffle furnace and calcined at 450° C. (heating rate of 5° C./min) under an air atmosphere for 10 h to obtain a heterojunction composite material consisting of one-dimensional $In_2O_3$ hollow nanotube and two-dimensional $ZnFe_2O_4$ nanosheets ($In_2O_3$ @ $ZnFe_2O_4$-600 s). The resulting composite is almost completely covered by $ZnFe_2O_4$ nanosheets.

Embodiment 6

Figure 4:
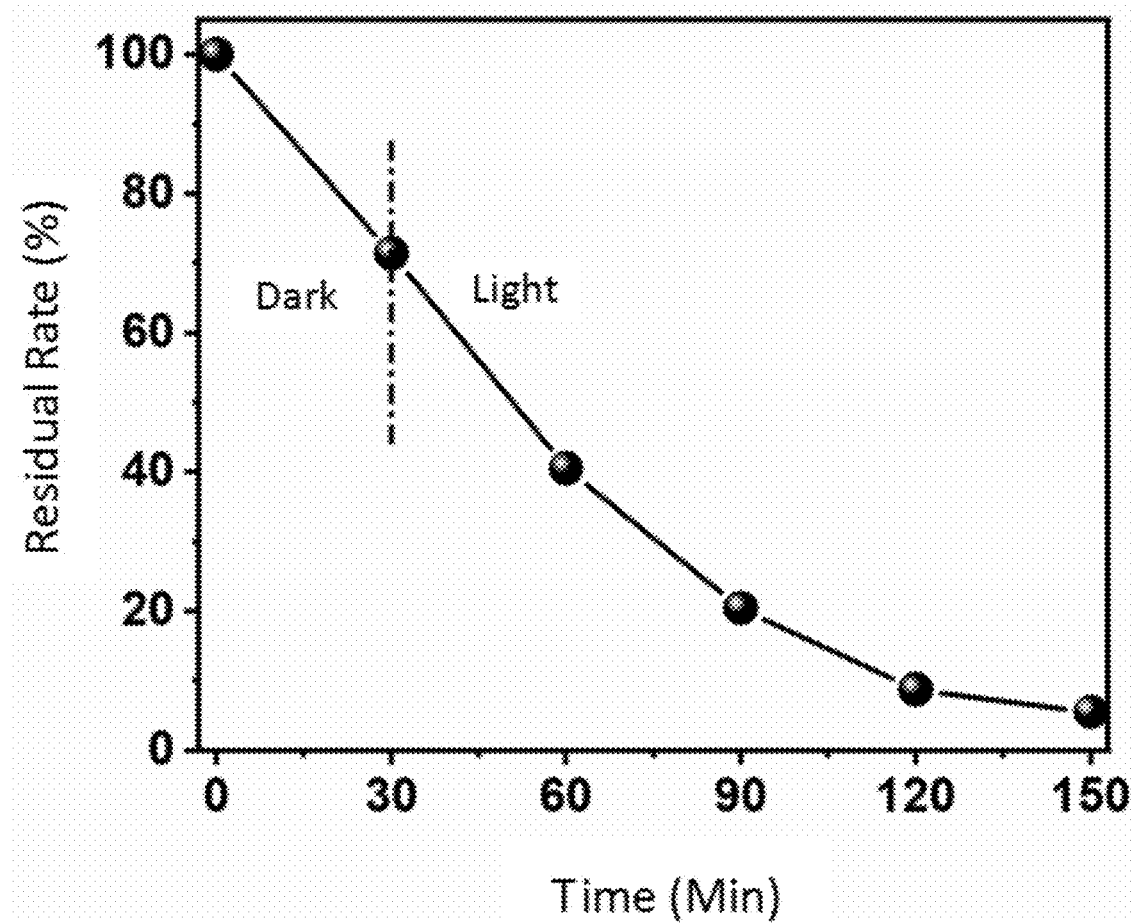
FIG. 4 is the Tetracycline photodegradation curve for $In_2O_3$@$ZnFe_2O_4$-500.

The heterojunction composite material consisting of one-dimensional $In_2O_3$ hollow nanotube and two-dimensional $ZnFe_2O_4$ nanosheets ($In_2O_3$ @ $ZnFe_2O_4$-500 s) degradation experiment of tetracycline: Weigh 50 mg of the photocatalyst $In_2O_3$ @ $ZnFe_2O_4$-500 s obtained in Embodiment 4, place it in 100 mL of tetracycline aqueous solution with a concentration of 10 mg/L. Stir for half an hour in the dark to achieve adsorption-desorption equilibrium. After equilibration, the catalyst is irradiated with a 300 W xenon lamp, and 5 mL is sampled every half hour, using a UV spectrophotometer, and referring to the standard curve, to obtain the residual concentration of tetracycline in the corresponding water sample. FIG. 4 is a graph showing the relationship between the absorbance of residual tetracycline and time. It can be seen from the figure that under the condition of adding $In_2O_3$ @ $ZnFe_2O_4$-500 s and applying light, the removal rate of tetracycline in the aqueous solution reaches more than 95% after 120 minutes of light; in the same way, $In_2O_3$ @ $ZnFe_2O_4$-400 s, $In_2O_3$ @$ZnFe_2O_4$-600 s, $ZnFe_2O_4$, pure $In_2O_3$ hollow nanotubes are exposed to light for 120 minutes, and the removal rates of tetracycline in the aqueous solution reached 85%, 88%, 25%, and 43%, respectively.

Embodiment 7

Figure 5:
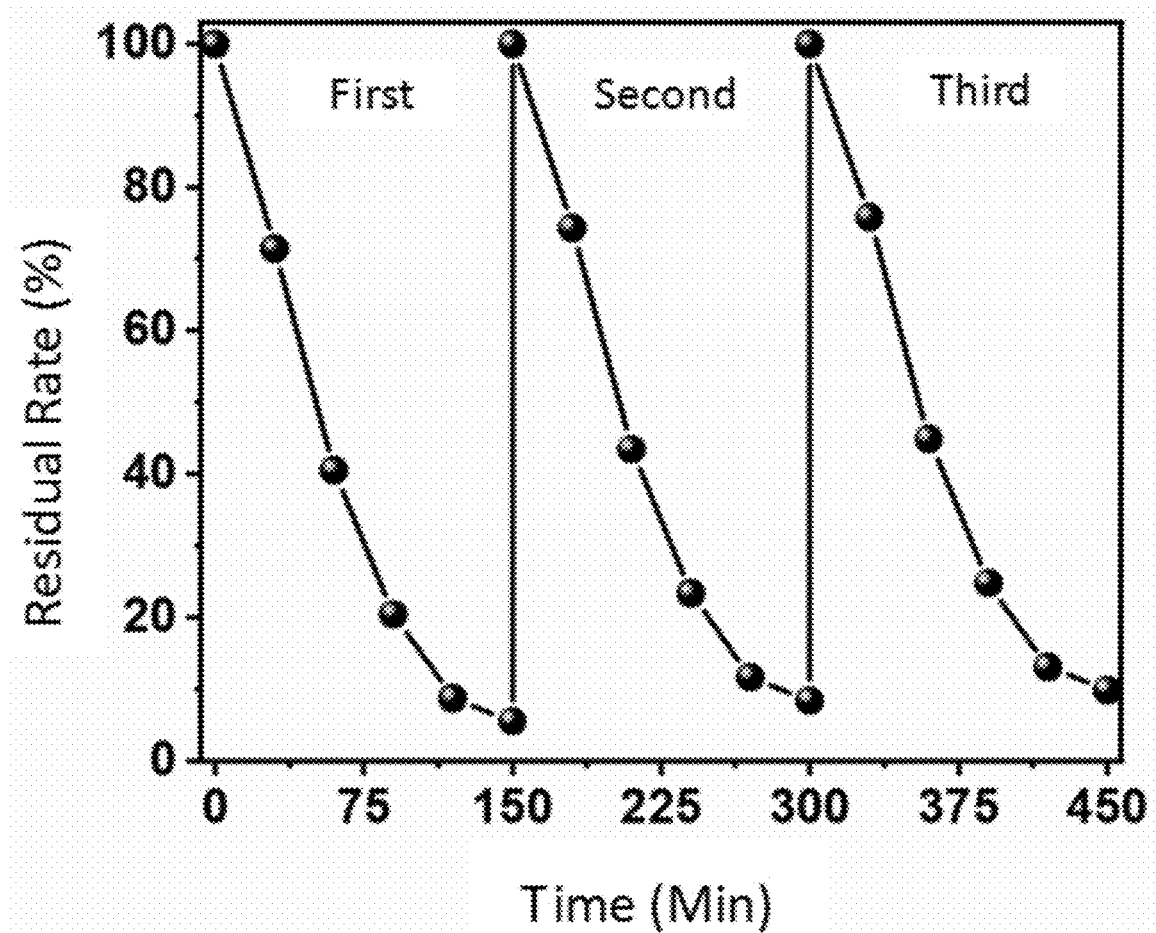
FIG. 5 shows the recycling performance of $In_2O_3$@$ZnFe_2O_4$-500 towards tetracycline photodegradation.

The heterojunction composite material consisting of one-dimensional $In_2O_3$ hollow nanotube and two-dimensional $ZnFe_2O_4$ nanosheets ($In_2O_3$ @ $ZnFe_2O_4$-500 s) cyclic degradation experiment of tetracycline: due to the heterojunction composite material consisting of one-dimensional $In_2O_3$ hollow nanotube and two-dimensional $ZnFe_2O_4$ nanosheets ($In_2O_3$ @ $ZnFe_2O_4$-500 s) is ferromagnetic, so after degrading 10 ppm of tetracycline for 120 minutes, a magnet can be used to effectively separate the catalyst. After that, the catalyst obtained by the above separation is dried in a 60° C. oven for 12 hours, and then placed again in 100 mL of a tetracycline aqueous solution with a concentration of 10 mg/L. Stir for half an hour in the dark to achieve adsorption-desorption equilibrium. After equilibration, the catalyst is irradiated with a 300 W xenon lamp, and 5 mL is sampled every half hour, using a UV spectrophotometer, and referring to the standard curve, to obtain the residual concentration of tetracycline in the corresponding water sample. After three cycles, the relationship between residual tetracycline absorbance and time is shown in FIG. 5. As can be seen from the figure, its catalytic performance is basically stable, and it still maintains good catalytic performance, which shows that $In_2O_3$ @ $ZnFe_2O_4$-500 s has good stability, and in the process of circulation, only using a magnet will separate the compound. It is very convenient to separate the material from the solution, which provides convenience for practical use.

In summary, using the above two materials to construct a heterojunction composite material consisting of one-dimensional $In_2O_3$ hollow nanotube and two-dimensional $ZnFe_2O_4$ nanosheets with visible light response, this design is not only conducive to the separation and migration of photo-generated carriers, it also improves the adsorption of pollutant molecules, and also exposes abundant surface catalytic active sites. In the present invention, the In template is first used to obtain one-dimensional hollow indium oxide ($In_2O_3$) nanotube by calcination in the air, and then the one-dimensional hollow $In_2O_3$ nanotube are used as the carrier to obtain one-dimensional hollow nanotube/two-dimensional nanosheet heterojunction composite material ($In_2O_3$ @ $ZnFe_2O_4$) by the method of electrodeposition followed by calcination. Using the above composite material as a photocatalyst, the tetracycline is catalytically degraded under visible light irradiation. The one-dimensional hollow nanotube and two-dimensional nanosheet heterojunction composite materials ($In_2O_3$ @ $ZnFe_2O_4$) invented by the present invention can efficiently purify tetracycline and other organic pollutants in water through photocatalytic methods.

We claim:

1. A method of preparing a heterojunction composite material consisting of one-dimensional $In_2O_3$ hollow nanotube and two-dimensional $ZnFe_2O_4$ nanosheets, comprising the following steps: 1) using an indium salt as raw material to prepare an In template by a solvent-thermal method; 2) calcining the In template using atmospheric air to obtain $In_2O_3$; 3) using an electrodeposition method to load zinc-iron bimetallic hydroxide nanosheets on the surface of $In_2O_3$ to obtain an $In_2O_3$ supported zinc-iron bimetallic hydroxide composite material; then calcining the $In_2O_3$ supported zinc-iron bimetallic hydroxide composite material at high temperature in air to obtain a heterojunction composite material consisting of one- dimensional $In_2O_3$ hollow nanotube and two-dimensional $ZnFe_2O_4$ nanosheets, wherein in step (1), the indium salt and a terephthalic acid are dissolved in a solvent to obtain a mixed solution; the mixed solution is then refluxed to obtain the In template; the indium salt is $In(NO_3)_3 \cdot 4.5H_2O$; the solvent is DMF; the mixed solution is refluxed at 110 to 130° C. for 25 to 35 min; and a ratio of the indium salt, the terephthalic acid and the solvent is 30 mg:30 mg: 30 mL.

2. The method according to claim 1, wherein in step (2), the In template is dispersed in ethanol and a Nafion solution to obtain a coating liquid; then the coating liquid is coated on the surface of an ITO glass, then dried and calcined in atmospheric air to prepare $In_2O_3$.

3. The method according to claim 1, wherein in step (2), the calcination is first incubating at 120° C. for 2 h, then raising the temperature to 500 to 550° C. with the heating rate of 2 to 5° C./min, and calcining for 2 hours.

4. The method according to claim 1, wherein in step (3), the electrodeposition method comprises: applying a three-electrode system, obtaining an electrolyte solution by dissolving zinc nitrate hexahydrate and ferric nitrate nonahydrate in water, conducting electrodeposition for 400 s to 600 s; and conducting calcination at 450 to 500 ° C. for 10~12 h with a heating rate of 2 to 5° C./min.

5. The method according to claim 4, wherein in the three-electrode system, a platinum wire electrode serves as a counter electrode and a calomel electrode serves as a reference electrode; the molar ratio of zinc nitrate hexahydrate and ferric nitrate nonahydrate is 1:2.

6. The heterojunction composite material consisting of one-dimensional $In_2O_3$ hollow nanotube and two-dimensional $ZnFe_2O_4$ nanosheets prepared according to the method of claim 1.

7. A method of removing a water pollutant, comprising: providing the heterojunction composite material consisting of one-dimensional $In_2O_3$ hollow nanotube and two-dimensional $ZnFe_2O_4$ nanosheets of claim 6; and contacting polluted water with the heterojunction composite material consisting of one-dimensional $In_2O_3$ hollow nanotube and two-dimensional $ZnFe_2O_4$ nanosheets to remove the water pollutant.

8. The method of claim 7, wherein the water pollutant is an antibiotic.

9. The method of claim 7, wherein contacting water with the heterojunction composite material consisting of one-dimensional $In_2O_3$ hollow nanotube and two-dimensional $ZnFe_2O_4$ nanosheets is carried out under light.

* * * * *